(No Model.)

E. F. WELLS.
INSECT DESTROYER.

No. 395,022. Patented Dec. 25, 1888.

Witnesses.
Benjamin Wardle.
Thos. A. Foulkes

Inventor.
Edwin Frederick Wells
by Ferdinand Bosshardt
Attorney.

N. PETERS, Photo-Lithographer, Washington, D. C.

UNITED STATES PATENT OFFICE.

EDWIN FREDERICK WELLS, OF CHRISHALL, (ROYSTON,) COUNTY OF ESSEX, ENGLAND.

INSECT-DESTROYER.

SPECIFICATION forming part of Letters Patent No. 395,022, dated December 25, 1888.

Application filed June 16, 1888. Serial No. 277,371. (No model.) Patented in England September 9, 1887, No. 12,256.

*To all whom it may concern:*

Be it known that I, EDWIN FREDERICK WELLS, engineer, a subject of the Queen of Great Britain, residing at Chrishall, (Royston,) in the county of Essex, England, have invented a new and useful Insect-Destroyer, (for which I have obtained provisional protection in Great Britain, No. 12,256, dated September 9, 1887,) of which the following is a specification.

My invention relates to improvements in insect-destroyers which are manipulated with the hand, and has for its object to make the same more effective by providing means for minimizing the resistance offered by the air in approaching or striking the insects. I attain this object by the instrument illustrated by the accompanying drawings, in which—

Figure 1:
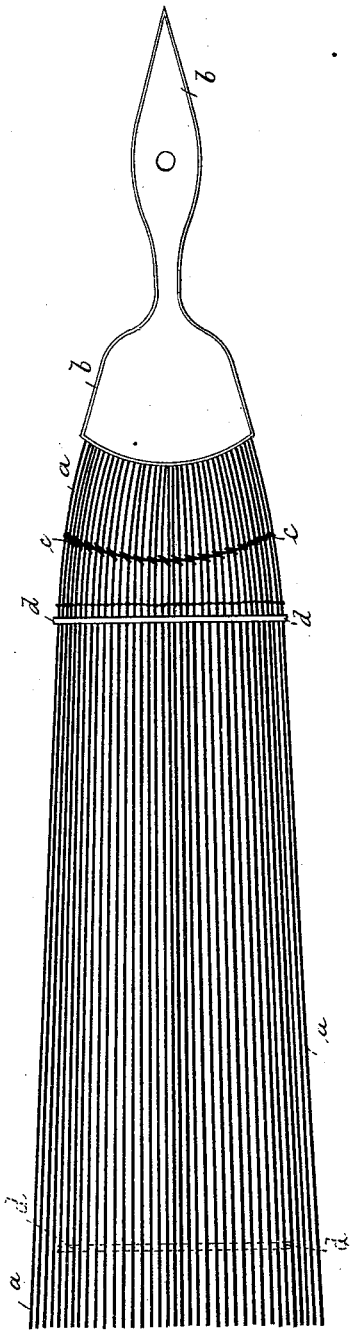
Figure 3:
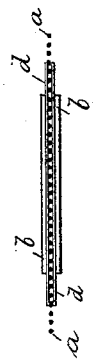
Figure 2:

Figure 1 is a front view, Fig. 2 a side view, and Fig. 3 a plan or end view, of the entire instrument.

Similar letters refer to similar parts throughout the several views.

This insect-destroyer consists of a number of strips or rods, $a$, of suitable material, preferably of cane, fixed into a suitable handle, $b$. These strips or rods $a$ are made very light and thin and fixed into the said handle $b$ so as to form a row, each strip or rod $a$ being a little apart from the other, in order to permit the air to pass between them, thus minimizing the resistance, and consequently preventing the propulsion of air against the insects in the act of approaching or striking the same, which otherwise alarms the insects and causes the same to escape. Near the handle $b$ the said strips or rods $a$ are tied or bound together by means of a cord or tapes, $c$, for the purpose of giving the row of rods or strips $a$ the required stiffness and steadiness.

When the instrument is not in use, the binder $d$, which otherwise is slid and left in position near the handle $b$, is moved toward the free ends of the strips or rods $a$, (see dotted lines,) and serves to keep the same straight and prevents twisting.

The insect-destroyer is used as follows: If a room is infested with flies, wasps, or other winged insects, should they be on the wing, close the door. A few strokes with the instrument will cut down numbers of them. The rest will settle down on the walls and furniture, and they can then be killed as fast as a person chooses.

Having now described the nature of my invention and in what manner the same is to be performed, I declare that what I claim is—

An insect-destroyer composed of cane strips or rods $a$, fixed into a handle, $b$, to form a single row, and having a binder, $d$, arranged to slide thereon, all substantially as and for the purpose specified.

EDWIN FREDERICK WELLS.

Witnesses:
EDWIN GOODE,
CHARLES FLACK.